3,042,653
HEAT STABILIZATION OF POLYCARBONATES
Bart Paul Jibben, Arnhem, Netherlands, assignor to N.V. Onderzoekingsinstituut Research, Arnhem, Netherlands, a corporation of the Netherlands
No Drawing. Filed Mar. 23, 1960, Ser. No. 16,910
Claims priority, application Netherlands Apr. 10, 1959
13 Claims. (Cl. 260—45.75)

This invention relates generally to polycarbonates, and more particularly to the stabilization of polycarbonates against degradative effects of heat.

These polycarbonates are prepared by known methods from the reaction of organic dihydroxy compounds and phosgene and/or chlorocarbonic acid esters of organic dihydroxy compounds. Some of these polycarbonates are prepared by the process described in U.S. application Serial No. 809,345, filed April 28, 1957, now Patent No. 2,989,503 and owned by the common assignee. Polycarbonates may be obtained in powdered or granular form and as such as formed into fibers, films, or other articles by extruding or injection molding the molten polymer. The heating of the polymers has heretofore resulted in many cases in a severe discloration of the final product. This discoloration is, of course, undesirable in certain applications, such as fibers, films or other articles.

It is therefore an object of this invention to provide a polycarbonate that is stabilized against the degradative effects of heat.

It is a further object of this invention to provide a process for stabilizing high molecular weight polycarbonates against the degradative effects of heat.

These and other objects of this invention will become apparent from the following detailed description.

The objects of this invention are accomplished by the addition to the polycarbonates of a small amount of a compound selected from the group consisting of aryl tin oxides, aryl tin hydroxides and compounds of the formula:

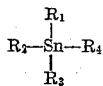

wherein $R_1$ is a radical selected from the group consisting of alkyl, cycloalkyl, and aryl radicals, and $R_2$, $R_3$ and $R_4$ are aryl radicals.

The amount of the stabilizer will vary depending upon the polycarbonate that is used. Such amounts are relatively simple to determine by experimentation. For example, very small amounts of the stabilizer are added to the polycarbonate and the amount is increased until the desired degree of stabilization against the degradative effect of heat is obtained. Normally less than 0.001% by weight based on the weight of the polycarbonate will not exert any stabilizing effect, and more than 6.0% by weight will not result in any substantial increase in the degree of stabilization. In addition, more than 6.0% by weight would be uneconomical.

The aryl tin oxides adn hydroxides which act as heat stabilizers for polycarbonates may contain alkyl substituents on the aryl radicals.

Examples of the aryl tin oxide which may be used in this invention are diphenyl tin oxide, bis(triphenyl) tin oxide, di(para-biphenyl) tin oxide, di(alpha-naphthyl) tin oxide, di(ortho-tolyl) tin oxide, and di(meta-tolyl) tin oxide.

Representative of the aryl tin hydroxides which may be used are: triphenyl tin hydroxide, tri(para-tolyl) tin hydroxide, and tri(alpha-naphthyl) tin hydroxide.

Examples of the compounds which fall within the definition of the general formula:

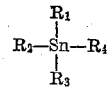

wherein $R_1$ is an alkyl, a cycloalkyl or an aryl radical, and $R_2$, $R_3$ and $R_4$ are aryl radicals, are: tetraphenyl tin, tetra(ortho-tolyl) tin, tetra(meta-tolyl) tin, tetra(para-tolyl) tin, tetra(para-xylyl) tin, tetra(para-biphenyl) tin, triphenyl alpha-naphthyl tin, triphenyl para-tolyl tin, triphenyl para-xylyl tin, triphenyl methyl tin, triphenyl ethyl tin, triphenyl benzyl tin, and triphenyl cyclohexyl tin.

These stabilizers may be added to the polycarbonate in several ways. For instance, powdered or granular polycarbonates may be mixed with the stabilizer after which the mixture is molded into the desired product by extrusion or injection molding. In addition, the stabilizer may be added to solutions of the polycarbonates and to the molten polycarbonates. It is also possible to add the stabilizer to the polycarbonate reaction mixture before or during the preparation of the polycarbonates.

The methods of preparation of the high molecular weight polycarbonates capable of being stabilized by this invention are well known. See, for example, the processes disclosed by U.S. application Serial No. 809,345. In that application, a method is described whereby an organic dihydroxy compound is reacted with phosgene or chlorocarbonic acid esters of organic dihydroxy compounds in the presence of dichloromethane, trichloromethane, or mixtures thereof. The polycarbonate is then formed in solution in the dichloromethane, etc., after which the solvent is evaporated and the polycarbonate is obtained in powdered form. The application also discloses a process whereby the polycarbonate solution is mixed with water and dimethylbenzene and then evaporated. It is possible to use other methods to prepare the polycarbonates without departing from the spirit and scope of this invention.

The organic dihydroxy compounds which may be used may be aromatic, aliphatic, or cycloaliphatic dihydroxy compounds. Also, the aromatic dihydroxy compounds may be reacted with aldehydes before or during the preparation of the polycarbonates.

Examples of the aromatic compounds are: di-(monohydroxy aryl) alkanes, di-(monohydroxy aryl) sulfones, di-(monohydroxy aryl) ethers, and di-(monohydroxy aryl) thioethers. The above aryl radicals may be the same or different and, in addition, they may have substituents, such as halogens and/or alkyl radicals. The radical linking the benzene rings of the di-(monohydroxy aryl) alkanes may be alkyl, cycloalkyl or aryl.

Representative of these aromatic dihydroxy compounds are: (4,4'-dihydroxydiphenyl) methane; 2,2-(4,4'-dihydroxydiphenyl) propane; 1,1-(4,4'-dihydroxy 3,3'-dimethyldiphenyl) cyclohexane; 2,2-(2,2'-dihydroxy 4,4'-ditertiarybutyldiphenyl) propane; 1,1-(4,4'-dihydroxydiphenyl) 1-phenylethane; 2,2-(4,4'-dihydroxy 3,3',5,5'-tetrachlorodiphenyl) propane; 4,4'-dihydroxydiphenyl sulphone; 4,4'-dihydroxy 3,3'-dimethyldiphenyl sulphone; 2,2'-dihydroxy 1,1'-dinaphthyl sulphone; 4,4'-dihydroxydiphenyl ether; 4,4'-dihydroxy 3,3'-dimethyldiphenyl ether; 4,4'-dihydroxydiphenyl thioether; and 4,4'-dihydroxy 2,2'-dimethyldiphenyl thioether.

Examples of other aromatic dihydroxy compounds are: hydroquinone; resorcinol; pyrocathechol; 2,4'-dihydroxydiphenol; 2,2'-dihydroxydiphenol; 1,4-dihydroxy naphthalene; 1,6-dihydroxy naphthalene; 2,6-dihydroxy naphthalene; 1,2-dihydroxy naphthalene; 1,5-dihydroxy anthacene, and 2,2'-dihydroxy dinaphthol-1,1'.

Examples of aliphatic and cycloaliphatic dihydroxy compounds are: ethylene glycol; diethylene glycol; triethylene glycol; polyethylene glycol; thiodiglycol; ethylene dithiodiglycol; propanediol-1,2, and the di- and polyglycols prepared from propylene oxide-1,2; propanediol-1,3; butanediol-1,3; butanediol-1,4; 2-methyl propanediol-1,3; pentanediol-1,5; hexanediol-1,6; octanediol-1,8; decanediol-1,10; cyclohexanediol-1,2; 2,2-(4,4'-dihydroxy dicyclohexyl) propane and 2,6-dihydroxy decahydronaphthalene.

The chlorocarbonic acid esters of organic dihydroxy compounds that are used in the preparation of the above polycarbonates may be any chlorocarbonic acid ester of the above-described organic dihydroxy compounds.

The following specific examples are offered as descriptive of this invention. They were selected merely for the purpose of illustration, and it should be understood that they are not to be considered as limiting this invention. The percentages by weight, unless otherwise indicated, are based on the weight of the polycarbonates.

*Example I*

A powdered polycarbonate was prepared from 2,2-(4,4'-dihydroxydiphenyl) propane and phosgene. The polycarbonate powder was mixed with 0.5% by weight of triphenyl tin hydroxide and compressed into tablets by conventional means. These tablets were processed into rods by a conventional extruder. One of these rods was dissolved in methylene chloride to a 5% solution. The solution exhibited an extinction of 0.28 at a wave length of 4000 A. in a cell of 10 cm. length. The polycarbonate tablets used above were dissolved to a 5% solution in methylene chloride. This solution had, measured in the above cell at 4000 A., an extinction of 0.25.

The same polycarbonate without the addition of triphenyl tin hydroxide was processed in the same manner into a thin rod. A 5% solution of this rod in methylene chloride exhibited an extinction of 0.38 at 4000 A. in a cell of 10 cm.

*Example II*

A polycarbonate in powdered form which had been prepared from 4,4'-dihydroxy-3,3'-dimethyldiphenyl sulfone and phosgene was mixed with 2.2% by weight of bis(triphenyl)tin oxide. The mixture was pressed into a small block in a press heated at 230° C. A similar polycarbonate in powdered form without the addition of bis(triphenyl)tin oxide was pressed into a small block in the same manner. The block which included the bis(triphenyl)tin oxide was considerably better in color than the block obtained without this addition.

*Example III*

A mixture consisting of 70 cc. methylene chloride and a solution of 34.4 grams of 2,2-(4,4'-dihydroxyphenyl) propane and 17.2 grams sodium hydroxide in 250 cc. water was mixed with 0.4 grams of tetraphenyl tin. During vigorous stirring, 17.9 grams of phosgene was added to the mixture. After adding 0.75 grams of triethyl benzyl ammonium chloride and 150 cc. of methylene chloride, the stirring was continued for an additional four hours. The methylene chloride layer was then separated from the above and washed with water. The polycarbonate dissolved in the methylene chloride was precipitated from the solution with methanol. The precipitate was filtered off, washed and dried and pressed into a small block in a press heated to 250° C. This block had a light brown color.

The above process was repeated without adding tetraphenyl tin. The resulting polycarbonate was processed into a small block in the same manner mentioned above. This block had a dark brown color.

*Example IV*

A polycarbonate in powdered form which had been prepared from 4,4'-dihydroxydiphenyl sulfone and the bischlorocarbonic acid ester of 4,4'-dihydroxydiphenyl sulfone was mixed with 0.4% by weight of triphenyl ethyl tin. The mixture was extruded into a thick thread. This thread had a light brown color.

The polycarbonate in powdered form without the addition of triphenyl ethyl tin was also extruded into a thread. This ribbon had a dark brown color.

*Example V*

Powdered polycarbonate which had been prepared from 2,2-(4,4'-dihydroxydiphenyl) propane and phosgene was fused in a steel tube by heating at 254° C. for ten minutes in a nitrogen atmosphere. This was repeated several times with the same polycarbonate but with the addition of 1.4% by weight of bis(triphenyl)tin oxide, 0.6% by weight of diphenyl tin oxide, 0.8% by weight of di-(alpha-naphthyl) tin oxide, and 0.6% by weight of di-(ortho-tolyl) tin oxide, respectively, to the polycarbonate powder.

These samples were individually dissolved in methylene chloride to a 5% solution and the extinction of each solution was determined at 4000 A. in a cell of 10 cm. length. The extinctions of these samples, in addition to the extinction of the unprocessed polycarbonate, are shown in the following Table I.

TABLE I

| Sample: | Extinction |
|---|---|
| Original polycarbonate | 0.19 |
| no additive | 0.34 |
| bis(triphenyl)tin oxide | 0.21 |
| diphenyl tin oxide | 0.19 |
| di-(alpha-naphthyl)tin oxide | 0.19 |
| di-(ortho-tolyl)tin oxide | 0.22 |

*Example VI*

Powdered polycarbonate which had been prepared from 2,2-(4,4'-dihydroxydiphenyl) propane and phosgene was fused in a steel tube by heating at 254° C. for ten minutes in a nitrogen atmosphere. This was repeated several times with the same polycarbonate but with the addition of 1.1% by weight of tetraphenyl tin, 1.2% by weight of tetra(para-tolyl)tin, 1.0% by weight of triphenyl ethyl tin, 1.2% by weight of triphenyl alpha-naphthyl tin, and 1.1% triphenyl benzyl tin, respectively, to the polycarbonate powder.

These samples were processed as in Example V, and the extinction values were determined in the same manner. The following Table II illustrates the results obtained.

TABLE II

| Sample: | Extinction |
|---|---|
| Original polycarbonate | 0.22 |
| No additive | 0.42 |
| tetrapenyl tin | 0.20 |
| tetra(para-tolyl)tin | 0.23 |
| triphenyl ethyl tin | 0.26 |
| triphenyl alpha-naphthyl tin | 0.22 |
| triphenyl benzyl tin | 0.21 |

*Example VII*

A polycarbonate in powdered form prepared from 1,1-(4,4'-dihydroxydiphenyl)cyclohexane and the bischlorocarbonic acid ester of 1,1-(4,4'-dihydroxy diphenyl) cyclohexane was pressed into a small block in a press heated at 280° C.

A similar polycarbonate in powdered form was mixed with 3.0% by weight of tri(alpha-naphthyl)tin hydroxide and subsequently pressed into a small block in the same manner. This block was considerably brighter in color than the block pressed from the polycarbonate to which no tri(alpha-naphthyl)tin hydroxide had been added.

*Example VIII*

A polycarbonate in powdered form, prepared from 2,2-(4,4'-dihydroxydiphenyl) propane and phosgene, was mixed with 1.7% by weight of bis(triphenyl)tin oxide and subsequently compressed into tablets. The tablets were processed into combs by an injection molding machine. These combs had a light brown color.

The polycarbonate in powdered form without the addition of bis(triphenyl)tin oxide was processed into combs in the same manner. These combs had a dark brown color.

It can be seen from the foregoing examples that the compounds of this invention stabilize the above-described high molecular weight polycarbontes against the degradative effects of heat.

It should be understood that many modifications or additions may be made in the practice of this invention without departing from the spirit and scope of this invention which is to be limited only by the following claims.

What is claimed is:

1. A polycarbonate stabilized against degradative effects of heat by the addition of a small amount of a compound selected from the group consisting of aryl tin oxides, aryl tin hydroxides, and compounds of the formula:

$$R_2-\underset{\underset{R_3}{|}}{\overset{\overset{R_1}{|}}{Sn}}-R_4$$

wherein $R_1$ is a radical selected from the group consisting of alkyl, cycloalkyl, and aryl radicals, and $R_2$, $R_3$, and $R_4$ are aryl radicals.

2. A polycarbonate according to claim 1 wherein said compound is an aryl tin oxide.

3. A polycarbonate according to claim 1 wherein said compound is an aryl tin hydroxide.

4. A polycarbonate according to claim 1 wherein said compound is a compound of the general formula:

$$R_2-\underset{\underset{R_3}{|}}{\overset{\overset{R_1}{|}}{Sn}}-R_4$$

wherein $R_1$ is a radical selected from the group consisting of alkyl, cycloalkyl and aryl radicals, and $R_2$, $R_3$, and $R_4$ are aryl radicals.

5. A polycarbonate according to claim 1 wherein said compound is selected from the group consisting of tetraphenyl tin, tetra(para-tolyl) tin, triphenyl ethyl tin, triphenyl alpha-naphthyl tin, and triphenyl benzyl tin.

6. A polycarbonate according to claim 1 wherein said compound is selected from the group consisting of bis-(triphenyl) tin oxide, diphenyl tin oxide, di-(alpha-naphthyl) tin oxide, and di-(ortho-tolyl) tin oxide.

7. A polycarbonate according to claim 1 wherein said compound is selected from the group consisting of tri-(alpha-naphthyl) tin hydroxide and triphenyl tin hydroxide.

8. A polycarbonate according to claim 1 wherein said small amount is about 0.001% to about 6.0% by weight based on said polycarbonates.

9. A method for stabilizing polycarbonates against the degradative effect of heat which comprises admixing with said polycarbonates a compound selected from the group consisting of aryl tin oxides, aryl tin hydroxides, and compounds of the formula:

$$R_2-\underset{\underset{R_3}{|}}{\overset{\overset{R_1}{|}}{Sn}}-R_4$$

wherein $R_1$ is a radical selected from the group consisting of alkyl, cycloalkyl, and aryl radicals, and $R_2$, $R_3$, and $R_4$ are aryl radicals.

10. A process according to claim 9 wherein said compound is an aryl tin oxide.

11. A process according to claim 9 wherein said compound is an aryl tin hydroxide.

12. A process according to claim 9 wherein said compound is a compound of the general formula:

$$R_2-\underset{\underset{R_3}{|}}{\overset{\overset{R_1}{|}}{Sn}}-R_4$$

wherein $R_1$ is a radical selected from the group consisting of alkyl, cycloalkyl, and aryl radicals, and $R_2$, $R_3$, and $R_4$ are aryl radicals.

13. A process according to claim 9 wherein said compound is admixed in an amount of about 0.001% to about 6.0%, based on the weight of said polycarbonates.

References Cited in the file of this patent

FOREIGN PATENTS

| | | |
|---|---|---|
| 506,310 | Canada | Oct. 4, 1954 |
| 1,094,232 | France | Dec. 1, 1954 |
| 578,585 | Canada | June 30, 1959 |